J. L. PASCAL.
GEARING.
APPLICATION FILED JAN. 13, 1916.

1,231,422.

Patented June 26, 1917.
3 SHEETS—SHEET 1.

Inventor
John L. Pascal

Witnesses

By F. O. McCleary
Attorney

J. L. PASCAL.
GEARING.
APPLICATION FILED JAN. 13, 1916.

1,231,422.

Patented June 26, 1917.
3 SHEETS—SHEET 2.

Inventor
John L. Pascal

Witnesses

By F. O. McCleary
Attorney

J. L. PASCAL.
GEARING.
APPLICATION FILED JAN. 13, 1916.
1,231,422.
Patented June 26, 1917.
3 SHEETS—SHEET 3.
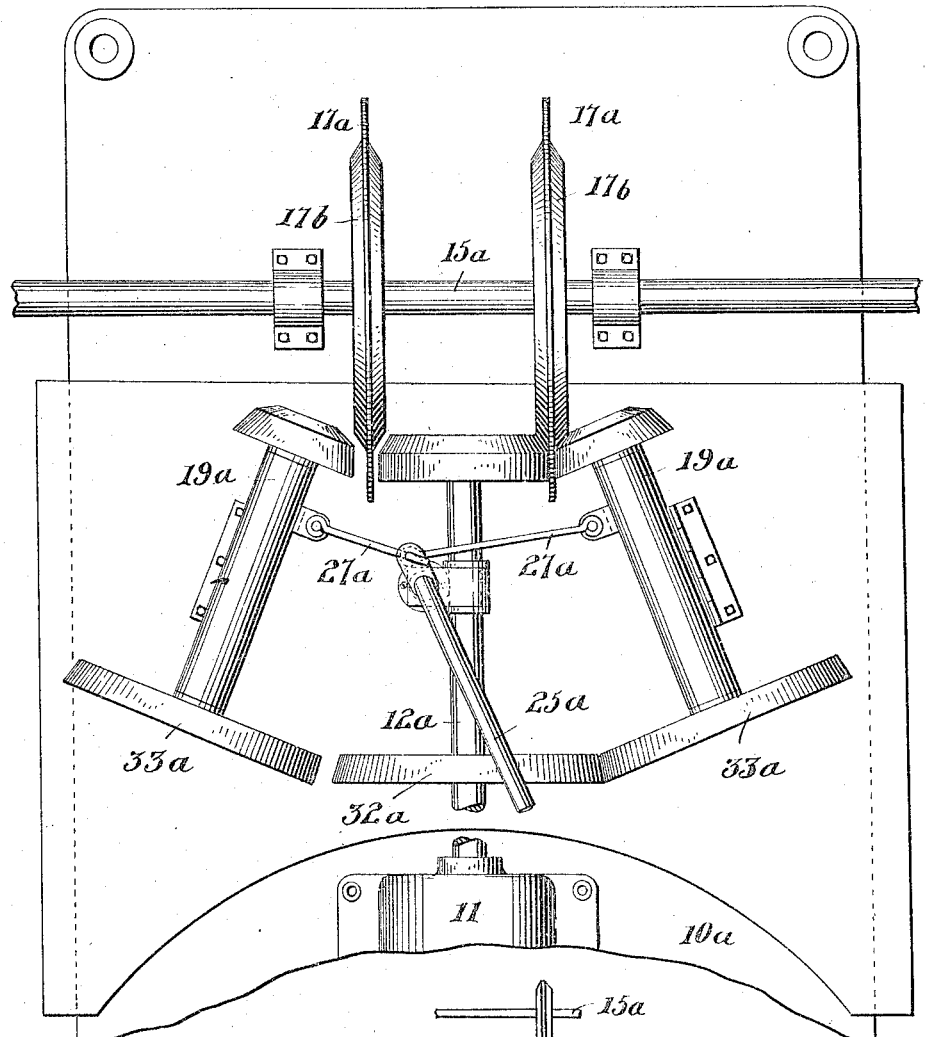

UNITED STATES PATENT OFFICE.

JOHN L. PASCAL, OF POCAHONTAS, IOWA.

GEARING.

1,231,422. Specification of Letters Patent. Patented June 26, 1917.

Application filed January 13, 1916. Serial No. 71,939.

*To all whom it may concern:*

Be it known that I, JOHN L. PASCAL, a citizen of the United States, residing at Pocahontas, in the county of Pocahontas and State of Iowa, have invented certain new and useful Improvements in Gearing, of which the following is a specification.

This invention relates to friction gearing and its primary object is to provide improved friction mechanism for transmitting power from a motor to drive machinery of various kinds as lathes, hoisting drums, motor boats, or automobiles.

The invention consists of a disk shaft supported in bearings that permit a longitudinal movement of the shaft, in combination with bevel friction gears mounted upon a shaft connected to a motor shaft, and friction gears disposed upon jack shafts on either side of the motor shaft.

The invention also includes mechanism to provide for either variable speed driving, or reversible drive only.

With the above and other objects in view, the invention consists in general of certain novel details of construction, combinations of parts, and arrangements of elements hereinafter fully described, illustrated in the accompanying drawings, and specifically claimed.

In the accompanying drawings, like characters of reference indicate like parts in the several views, and:—

Figs. 5 and 6 are plan views of a modified construction of the invention.

Figure 1:
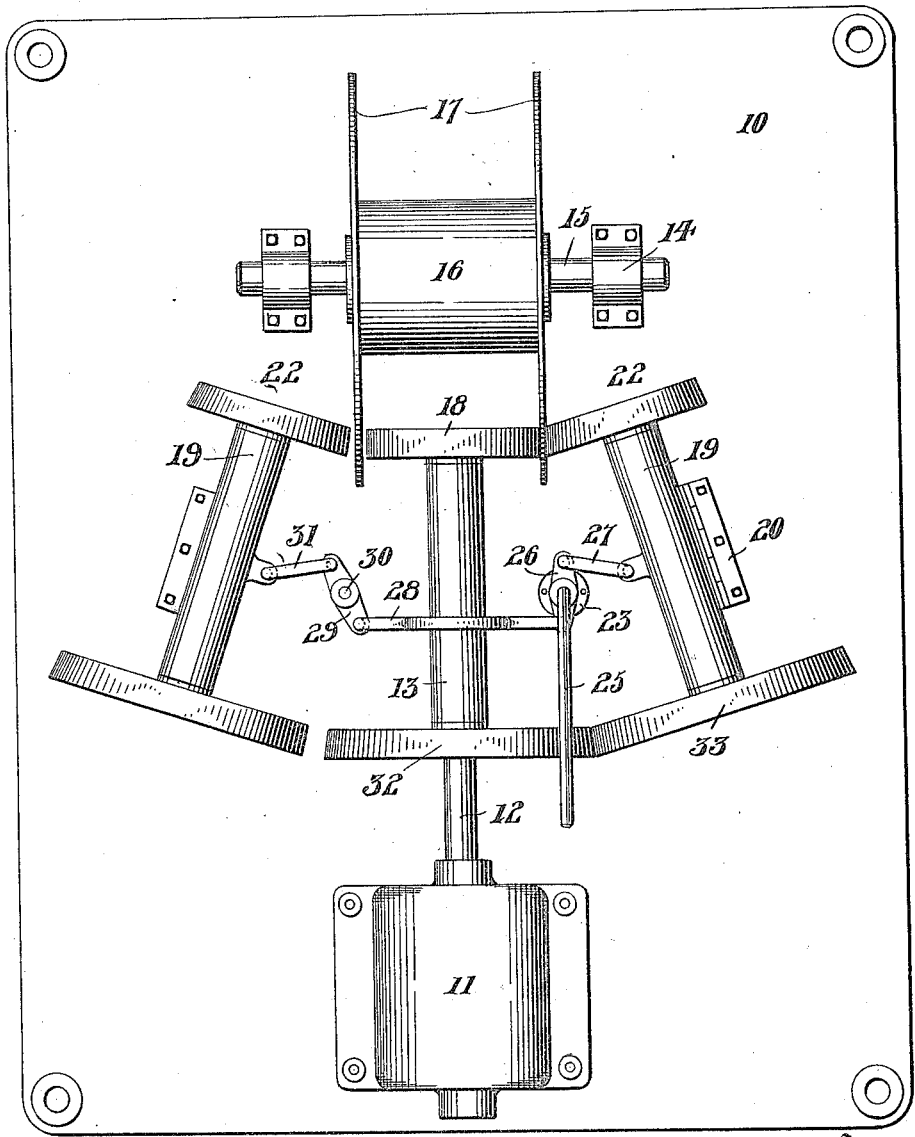
Figure 1 is a plan view of a friction driving gear constructed in accordance with this invention.
Figure 2:
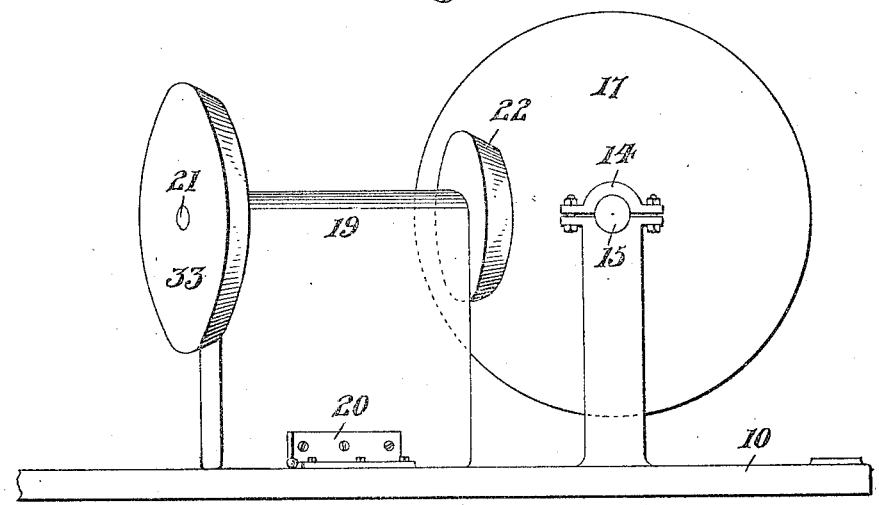
Fig. 2 is a side elevation of certain parts of the mechanism, other parts being omitted for the sake of clearness.
Figure 3:
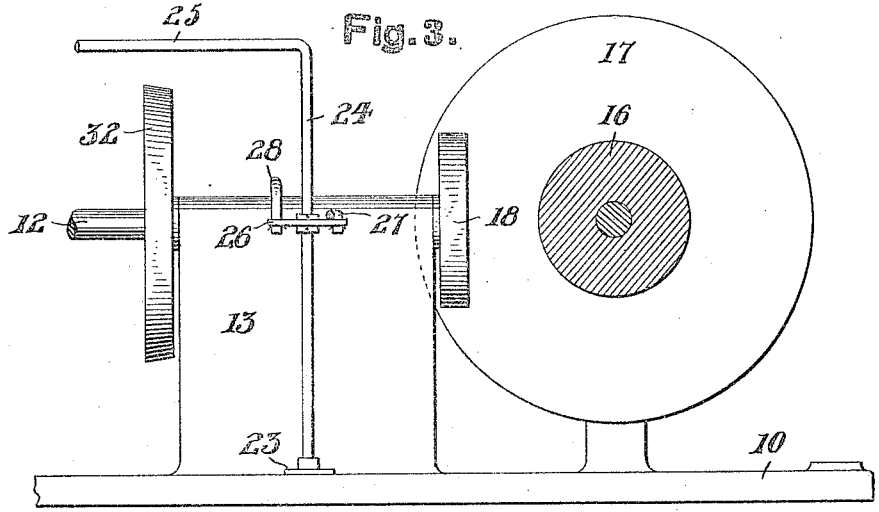
Fig. 3 is a side elevation showing the center portion of the gearing as constructed in accordance herewith.
Figure 4:
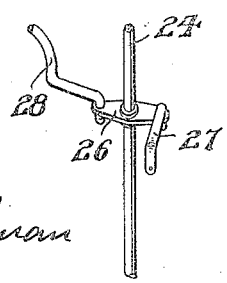
Fig. 4 is a detail showing a portion of one means for operating the gearing and reversing the position thereof.

Referring now to Figs. 1 to 4, in carrying out the objects of the invention, there is preferably provided a suitable base 10 whereon is mounted a motor 11 of any preferred form. This motor 11 has a shaft 12 which, when the motor is in operation, revolves constantly in one direction. The outer end of this shaft 12 is supported in a bearing 13 fixed to the base 10. Extending upward from the base 10 are spaced bearings 14 wherein is slidably and rotatably mounted a shaft 15 carrying a drum 16 provided with end flanges 17. On the extremity of the shaft 12 is mounted a friction disk or gear 18 which lies between the flanges 17 and may, by sliding movement of the shaft 15, be brought into contact with one or the other of said flanges. Diagonally-disposed with reference to the shaft 12 are bearings 19 which are hinged to the base 10 as at 20 and in each of these bearings is mounted a suitable shaft 21 which carries on the end adjacent the drum a bevel friction gear 22.

Pivoted in a suitable bearing 23 is an operating shaft 24 provided with a handle 25. On this operating shaft is mounted a two-armed rock lever 26 which is connected by a link 27 with one of the bearings 20 and by a link 28 with a second two-armed rock lever 29 carried on a suitable shaft 30, the remaining end of the second lever being connected by a link 31 with the other bearing 19. On the shaft 12 is mounted, adjacent the motor, a friction gear 32 and on each of the shafts 21 is mounted a similar friction gear 33 adapted to mesh with the gear 32 according as one or the other of said bearings 20 is rocked on its hinge.

When it is desired to drive the drum in one direction, considering Fig. 1, the handle 25 is moved to the left, so that the right-hand gear 22 is brought into engagement with the right-hand flange 17 while the left-hand gear 22 is thrown out of such engagement. This causes the right-hand flange 17 to be clamped between the disk 18 and the right-hand gear 22, thus rotating the drum in one direction. If it be desired to rotate the drum in the opposite direction, the handle 25 is moved to the left, when the reverse takes place and the left-hand flange 17 is grasped between the respective gear 22 and the gear or disk 18.

The construction covered by the foregoing description is designed especially for use in connection with hoisting machinery.

In Fig. 5 is shown a modified embodiment of the invention, involving structural variations from the construction of Fig. 1, but retaining the essential features of the above described construction, viz: the motor shaft 12ª, shaft 15ª, disks 17ª, hinged bearings 19ª supporting oppositely inclined jack-shafts. The elements 32ª and 33ª of this modification correspond to gears 32 and 33 of Fig. 1, The disks 17 of Fig. 1 are replaced by double faced friction gears 17$^b$.

The motor shaft and inclined jack shafts are supported on a sub-bed-plate movably mounted to vary the speed.

A further departure from Fig. 1 is the employment of toggle connections 27$^a$ between the hinged bearings 19$^a$ and an operating lever 25$^a$.

The modification shown in Fig. 6 illustrates a miter wheel on the line shaft 15$^a$ between the friction wheels on the jack-shafts.

Having thus described the invention, what is claimed as new is:—

1. In combination, a shaft provided with spaced friction disks, said shaft being mounted for rotative and longitudinal movement, a motor shaft with a bevel friction gear mounted thereon and a friction gear located between said disks, inclined jack-shafts mounted on either side of said motor shaft provided with a bevel friction gear at each end of each jack-shaft, hinged bearings supporting said jack-shafts, and means for bringing the last-named bevel friction gears into and out of contact with a gear on the motor shaft, and with said disks.

2. The combination with a longitudinally and rotatably mounted shaft provided with spaced friction disks, of a bearing arranged at right angles to said shaft, a base whereon said bearing is mounted, other bearings disposed diagonally with respect to the first bearing and hinged to said base, a drive shaft extending through the first bearing, driven shafts journaled in said hinged bearings, a friction gear on the drive shaft between the disks of the first shaft, friction gears on the driven shafts each exterior to a respective disk of the first shaft, a second friction gear on each of the driven shafts adapted for selective engagement with a second friction gear on the drive shaft, and means to cause engagement of the gears on the hingedly-supported shafts with a respective disk, and a second gear on the drive shaft.

3. In a friction drive, the combination with a motor shaft, of bevel friction gears mounted thereon, a line shaft supported at right angles to said motor shaft, inclined jack-shafts one on either side of said motor shaft, hinged bearings supporting said jack-shafts, disks and friction gears mounted on said line shaft arranged on either side of and adapted to engage a gear on the motor shaft, friction gears on said jack-shafts, and means for bringing the last-named gears into and out of contact with a gear on the motor shaft, and with said disks.

In testimony whereof I affix my signature in presence of two witnesses.

JOHN L. PASCAL.

Witnesses:
A. J. SHAW,
E. R. DONOHOE.

Copies of this patent may be obtained for five cents each, by addressing the "Commissioner of Patents, Washington, D. C."